US006045943A

United States Patent [19]

Nowaczyk

[11] Patent Number: 6,045,943

[45] Date of Patent: Apr. 4, 2000

[54] ELECTRODE ASSEMBLY FOR HIGH ENERGY DENSITY BATTERIES

[75] Inventor: Michael R. Nowaczyk, Colden, N.Y.

[73] Assignee: Wilson Greatbatch Ltd., Clarence, N.Y.

[21] Appl. No.: 08/964,175

[22] Filed: Nov. 4, 1997

[51] Int. Cl.[7] .................... H01M 2/26

[52] U.S. Cl. .................... 429/160; 429/161; 429/127

[58] Field of Search .................... 429/160, 161, 429/127

[56] References Cited

U.S. PATENT DOCUMENTS

| | | | |
|---|---|---|---|
| 5,667,909 | 9/1997 | Rodriguez et al. | 429/127 |
| 5,776,628 | 7/1998 | Kraft et al. | 429/161 X |

*Primary Examiner*—John S. Maples

*Attorney, Agent, or Firm*—Hodgson Russ Andrews Woods & Goodyear LLP

[57] ABSTRACT

A flat-folded, multi-plate electrode assembly is described. The electrode assembly consists of anode and cathode electrodes in the form of continuous strips having extension plates which are first folded against their connection electrode portions to provide anode and cathode plate pairs. The anode and the cathode are then operatively associated with each other such that at least a portion of the anode strip is interleaved between corresponding ones of the cathode plate pairs and at least a portion of the cathode strip is interleaved between corresponding ones of the anode plate pairs. The assembly is then "Z" folded into the desired electrode stack. The extension plates of both electrodes insure electrode overlap in each and every fold, thereby optimizing electrode output. This design has the advantage of permitting the electrodes to be enlarged due to the electrode configuration and header connection, eliminates multiple components and insures matched electrode overlap.

12 Claims, 3 Drawing Sheets

30B 30A 36A 34A 14 36B 16 26 22A 12 18A 24A 20 38 34B 30C 34C 36C 22B 18B 24B 30E 36D 22C 18C 30D 34D 24C 36E 40 34E 24D 22D 30F 34F 18E 18D 36F 22B 24E 32 30G 18F 22F 18G 18H 34G 24F 22G 22H 28 24G

ELECTRODE ASSEMBLY FOR HIGH ENERGY DENSITY BATTERIES

BACKGROUND OF THE INVENTION

1. Field of Invention

The present invention generally relates to the art of electrochemical energy, and more particularly, to a unique flat-folded, multi-plate electrode assembly that is generally applicable to energy storage devices of non-cylindrical or non-jellyroll configurations. Advantageously, the flat-folded, multi-plate electrode design of the present invention reduces the number of individual components and the number of mechanical connections required between the anode and cathode electrodes and their respective battery terminals. In that manner, the present invention simplifies the assembly process in a multi-plate electrochemical power source and is adaptable in a wide variety of electrode configurations and shapes for such applications as capacitors including electrolytic capacitors, ceramic capacitors, foil capacitors, super capacitators, double layer capacitators, and batteries including aqueous and nonaqueous primary and secondary batteries.

2. Prior Art

Wound batteries are a typical electrode configuration formed of a continuous anode and a continuous cathode assembly laid one on top of the other and wound into a jellyroll. Such an electrode configuration is desirable because the continuous anode and cathode electrodes require a minimal number of mechanical connections to their respective terminal leads, and the jellyroll assembly is generally recognized as preferred for high discharge and current pulse applications.

However, in some applications, a cylindrically shaped electrode assembly is not desired. Instead, a battery is required that fits inside of a casing having at least two spaced apart and planar side walls joined by end walls. Such prismatic shaped casings are commonly used to house multi-plate battery assemblies. A typical multi-plate battery assembly consists of a series of individual cathode plates inserted between an accordion folded, continuous anode in electrical contact with the casing. The cathode plates are then joined mechanically, such as by welding a series of leads to each of them and then connecting the leads to a bus. Not only does the typical multi-plate battery assembly require many individual components but the assembly process can be very time consuming.

What is needed is a electrode assembly that includes many of the desirable features of the jellyroll wound configuration such as unitary anode and cathode electrodes, but that is provided in a shape that can be housed inside of a prismatic casing. The electrode assembly of the present invention provides these advantages.

SUMMARY OF THE INVENTION

The flat-folded electrode configuration of the present invention comprises two strip electrodes having oppositely disposed electrode flaps at selected locations along the length of each of the electrodes so that when the assembly is "Z" folded, flaps from both electrodes are alternately disposed between each other. The resulting multi-plate electrode assembly according to the present invention insures that active material interface between the electrodes occurs over the largest available surface. Integral tabs extend from each of the electrode current collectors for anode to case and cathode to terminal lead connections. There can be single or multiple leads depending on electrical requirements and battery configuration.

The foregoing and additional advantages and characterizing features of the present invention will become clearly apparent upon a reading of the following detailed description together with the included drawings.

BRIEF DESCRIPTION OF THE DRAWING FIGURES

FIG. 1 is a plan view of an anode 12, a cathode 14 and a separator 16 before beginning the assembly operation.

DETAILED DESCRIPTION OF THE INVENTION

The terms "sequential plates" and "lateral plates" are used throughout the description of the various embodiments of the present invention. Sequential plates are active plates of either the anode or the cathode that follow each other in a continuous or connected series generally along a longitudinal axis of the electrode while a lateral plate is defined as one that hinges or otherwise extends in a non-longitudinal direction from the side of one of the sequential plates.

Figure 3:
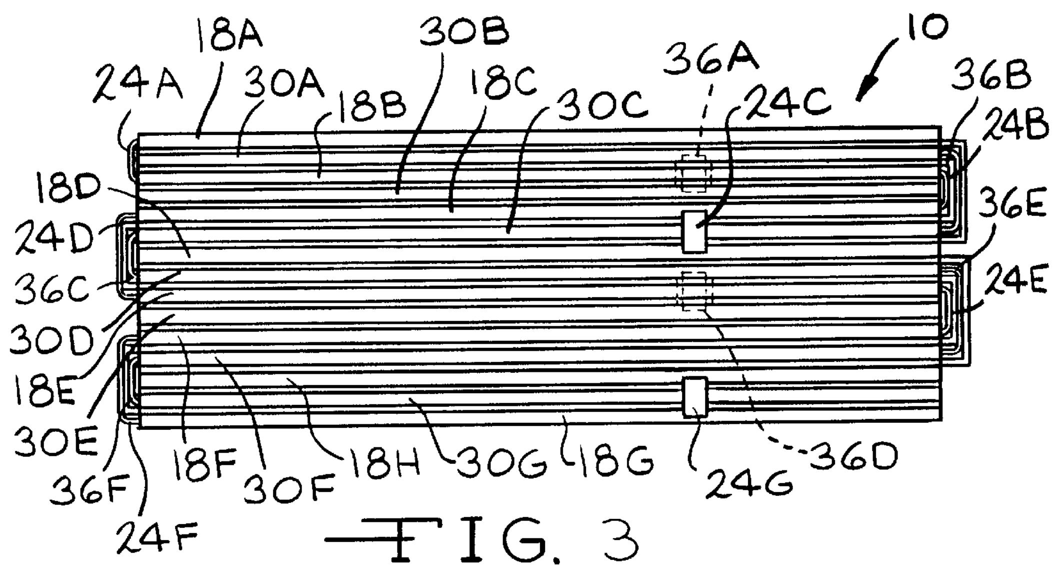
FIG. 3 is a plan view of a finished flat-folded electrode assembly 10 according to the present invention.

Turning now to the drawings, FIG. 3 shows a fully assembled flat-folded electrode assembly 10 according to the present invention. As particularly shown in FIG. 1, the electrode assembly 10 is comprised of an anode electrode, generally indicated at 12, a cathode electrode, generally indicated at 14 and a separator 16 positioned intermediate the anode and the cathode to prevent short circuit contact therebetween. Anode electrode 12 comprises a continuous, elongated element or structure, preferably of an anode active material such as an alkali metal provided in the form of eight plates 18A to 18H supported on contact portions (not shown) of a conductive member 20 serving as an anode current collector. Preferably the anode active material is contacted to both sides of the anode current collector 20.

Each of the anode plates 18A to 18H is generally in the shape of a rectangular sheet of the alkali metal having similarly sized steps 22A to 22H provided at one of the plate corners. However, those skilled in the art will readily recognize that the rectangular shape of the anode plates 18A to 18H is not necessary and that a myriad of other shapes can be readily envisioned by those skilled in the art without departing from the scope of the present invention.

The anode current collector 20 is comprised of a conductive material such as a conductive screen and the like having a shape similar to that of the anode plates 18A to 18H with connector portions 24A to 24G of the current collector bridging between adjacent plates. Preferably, the connector portions and the contact portions of the anode current collector 20 are a unitary member, however, that is not necessary. If desired, the contact portions of the anode current collector can be electrically connected to each other by welding the respective connector portions thereto, either before or after the anode active material has been contacted to the contact portions.

In particular, the anode electrode 12 comprises the current collector 20 having the first connector portion 24A bridging between the contact portions supporting sequential anode plates 18A and 18B. The second connector portion 24B is aligned along the longitudinal axis of the anode 12, in line with connector portion 24A, and bridges between the current collector contact portions supporting sequential anode plates 18B and 18C. The third connector portion 24C bridges between the contact portions of the anode current collector supporting plates 18C and 18D at a position normal to the longitudinal extent of the anode 12 such that anode plate 18D is a lateral plate extending from the side of plate 18C. A fourth connector portion 24D bridges between the contact portions of the current collector supporting sequential anode plates 18C and 18E. A fifth connector portion 24E bridges between the current collector contact portions supporting sequential anode plates 18E and 18F, and a sixth connector portion 24F bridges between the contact portions of the anode current collector supporting sequential plates 18F and 18G, both along the longitudinal extent of the anode 12. Finally, a seventh connector portion 24G bridges between the contact portions of the anode current collector supporting plates 18G and 18H at a position normal to the longitudinal extent of the anode as a lateral plate extending from the side of plate 18G in a similar manner as plate 18D extends from the side of plate 18C. The anode electrode 12 is further provided with a first tab 26 extending from the current collector supporting the first plate 18A and a second tab 28 extending from the contact portion of the seventh plate 18G, in a direction opposite tab 26.

Figure 1:
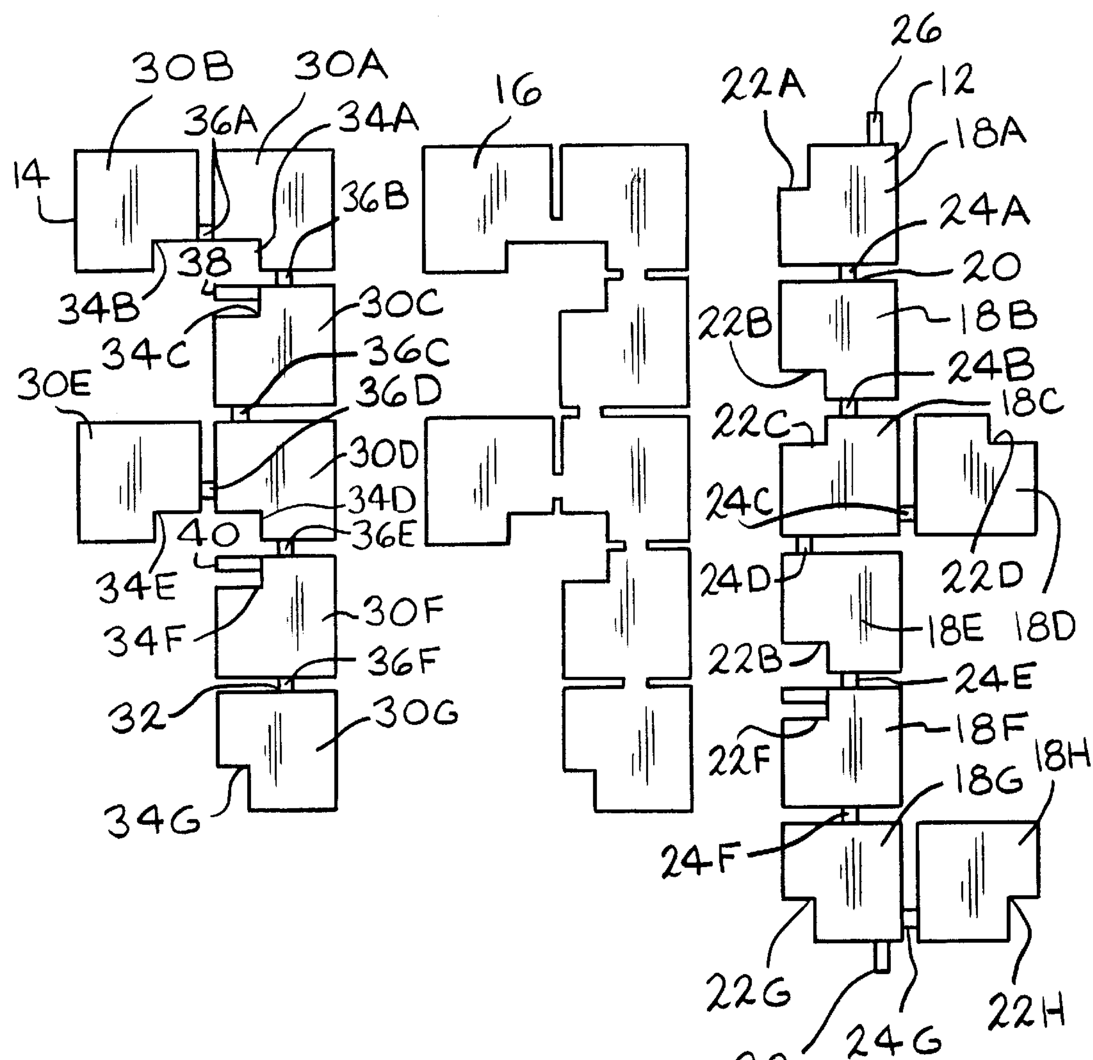

While the tabs 26, 28 are shown in FIG. 1 extending generally along the longitudinal extent of the anode 12, that is not necessary. There can be connector tabs extending from any one of the anode plates 18A to 18H, and the tabs can extend in both a horizontal and/or a vertical direction, as desired. At the least, one tab is required for connection to the anode terminal.

In the present embodiment, the anode current collector connector portions 24A to 26G are of a reduced width as compared to that of the contact portions supporting the various anode active material plates. This helps to conserve space inside the casing 29 (FIG. 4) for active materials. In an alternate embodiment of the present invention (not shown), the connector portions extend the entire width of the current collector supporting the anode plates.

It will be apparent to those skilled in the art that while the anode electrode 12 is shown comprised of eight plates supported on respective current collector contact portions joined together by the intermediate connector portions, that is for illustrative purposes only. In that respect, the anode 12 can be comprised of the current collector 20 having a greater or a lesser number of contact portions supporting respective anode plates than the exemplary eight plates shown.

In a similar manner as the anode electrode 12, the cathode electrode 14 is a continuous structure provided with seven plates 30A to 30G of active material contacting a conductive member 32 serving as a cathode current collector. The cathode plates 30A to 30G are preferably of a metal, a metal oxide, a metal sulfide, a mixed metal oxide, a carbonaceous material or a fluorinated carbon material, and are generally in the shape of rectangles provided with respective steps 34A to 34G. The cathode plates have a size generally matching that of the anode plates 18A to 18H. In that respect, while the rectangular shape is not required for the cathode plates, the shape of the respective anode and cathode plates must be similar so that when the electrodes are interleaved with each other, they substantially cover each other.

The cathode current collector 32 is comprised of a conductive material such as a conductive screen and the like having the contact portions of a shape similar to that of the cathode plates 30A to 30G with connector portions 36A to 36F of the current collector bridging between adjacent plates. Preferably, the connector portions and the contact portions (not shown) of the cathode current collector 32 are a unitary member, however, that is not necessary. If desired, the contact portions of the cathode current collector can be electrically connected to each other by welding the connector portions thereto, either before or after the cathode active material has been contacted to the contact portions.

In particular, the cathode electrode 14 comprises the current collector 32 having the first connector portion 36A bridging between the contact portions supporting cathode plates 30A and 30B such that plate 30B is normal to the longitudinal axis of the cathode 14 as a lateral plate extending from the side of plate 30A. A second connector portion 36B bridges between the current collector contact portions supporting sequential cathode plates 30A and 30C. A third connector portion 36C bridges between the contact portions of the cathode current collector supporting sequential plates 30C and 30D. A fourth connector portion 36D bridges between the contact portions of the current collector supporting cathode plates 30D and 30E at a position normal to the longitudinal extent of the cathode as a lateral plate extending from the side of plate 30D in a similar manner as plate 30B extends from the side of plate 30A. A fifth connector portion 36E bridges between the contact portions of the cathode current collector supporting sequential plates 30D and 30F while a sixth connector portion 36F bridges between the contact portions of the cathode current collector supporting sequential plates 30F and 30G along the longitudinal extent of the cathode electrode 14. Finally, a tab 38 extends laterally from the step 34C of the cathode plate 30C and a second tab 40 extends laterally from the step 34F of the cathode plate 30F.

As is the case with the anode electrode 12, the cathode connector portions 36A to 36F of the cathode electrode 14 are preferably of a reduced width as compared to that of the contact portions supporting the cathode active material. This helps to conserve space inside of the casing 29 for active materials. Also, there can be more cathode tabs than tabs 38 and 40 shown, and the tabs can extend from the current collector 32 in either a vertical or a horizontal orientation, as desired.

Separator 16 is provided having a configuration and shape sized somewhat larger than that of the cathode 14 including the connector portions extending between the cathode plates. That way, two separator sheets 16 are positioned on either side of the cathode and heat sealed or otherwise joined about their peripheries to completely envelope the cathode 14 before the cathode is assembled with the anode, as will be described in detail presently.

During assembly, lateral cathode plate 30B is first folded about the connector portion 36A toward cathode plate 30A and lateral cathode plate 30E is folded about the connector portion 36D toward cathode plate 30D. In a similar manner, lateral anode plate 18D is first folded about the connector portion 24C toward anode plate 18C and lateral anode plate 18H is folded about the connector portion 24G toward anode plate 18G. Then, as shown on FIG. 2, the anode 12 is operatively associated with the cathode 14 such that anode plate 18B is interposed or interleaved between cathode plates 30A and 30B, as shown by arrow 42, cathode plate 30C is interleaved between anode plates 18C and 18D, as shown by arrow 44, anode plate 18E is interleaved between cathode plates 30D and 30E, as shown by arrow 46, and cathode plate 30G is interleaved between anode plates 18G and 18H, as shown by arrow 48.

With the cathode 14 thus partially interleaved with the anode, and the anode partially interleaved with the cathode, the anode and cathode are now ready for final assembly into the electrode assembly 10 shown in FIG. 3. In that manner, the anode plate 18A is folded about connector portion 24A, up and over the cathode plate 30A so that the cathode plate 30A is disposed intermediate the anode plates 18A, 18B with the anode plate 18B already disposed intermediate the cathode plates 30A and 30B. This alternating anode/cathode plate configuration is folded about connector portions 24B and 36B, up and over the anode plate 18C so that the cathode plate 30B is disposed intermediate the anode plates 18B and 18C and with the cathode plate 30C already disposed intermediate the anode plates 18C and 18D. The resulting alternating anode/cathode plate configuration is folded about the connector portions 24D and 36C, up and over the cathode plate 30D so that anode plate 18D is disposed intermediate cathode plates 30C and 30D with anode plate 18E already disposed intermediate cathode plates 30D and 30E. This alternating anode/cathode plate configuration is folded about the connector portions 24E and 36E, up and over the anode plate 18F so that cathode plate 30E is disposed intermediate anode plates 18E and 18F. The resulting alternating anode/cathode plate configuration is folded about the connector portions 24F and 36F, up and over the cathode plate 30G so that cathode plate 30F is disposed intermediate anode plates 18F and 18H with the cathode plate 30G already disposed intermediate anode plates 18G and 18H flat-folded upon themselves to provide the multi-plate electrode stack, as the electrode assembly 10 shown in FIG. 3.

Thus, the completed flat-folded electrode assembly 10 shown in FIG. 3 comprises the following electrode plate sequence moving from the top of the drawing down: anode plate 18A/cathode plate 30A/anode plate 18B/cathode plate 30B/anode plate 18C/cathode plate 30C/anode plate 18D/cathode plate 30D/anode plate 18E/cathode plate 30E/anode plate 18F/cathode plate 30F/anode plate 18H/cathode plate 30G/anode plate 18G.

By way of example, in an illustrative battery according to the present invention, the anode active material is an alkali metal selected from Group IA of the Periodic Table of Elements and contacted to a nickel current collector, and the cathode active material is of a carbonaceous material, fluorinated carbon, metal, metal oxide, mixed metal oxide or a metal sulfide, and mixtures thereof. Preferably, the cathode material is mixed with a conductive diluent such as carbon black, graphite or acetylene black or metallic powders such as nickel, aluminum, titanium and stainless steel, and with a fluoro-resin powder binder material such as powdered polytetrafluroethylene or powdered polyvinylidene fluoride. The thusly prepared cathode active admixture is contacted to the cathode current collector which is a thin sheet or metal screen, for example, a titanium, stainless steel, aluminum or nickel screen.

The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include woven and non-woven fabrics of polyolefinic fibers or fluoropolymeric fibers including polyvylidine fluoride, polyethylenetetrafluoroethylene, and polyethylenechlorotrifluoroethylene laminated or superposed with a polyolefinic or a fluoropolymeric microporous film. Suitable microporous films include a polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The exemplary battery of the present invention having the flat-folded electrode assembly is activated with an tonically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, electrolytes suitable for the present invention include both aqueous and nonaqueous solutions that are substantially inert to the anode and cathode materials, and that exhibit those physical properties necessary for ionic transport, namely, low viscosity, low surface tension and wettability.

By way of example, a suitable electrolyte for an alkali metal active anode has an inorganic or organic, tonically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The ionically conductive salt serves as the vehicle for migration of the anode ions to intercalate or react with the cathode active material. Preferably the ion-forming alkali metal salt is similar to the alkali metal comprising the anode.

Figure 4:
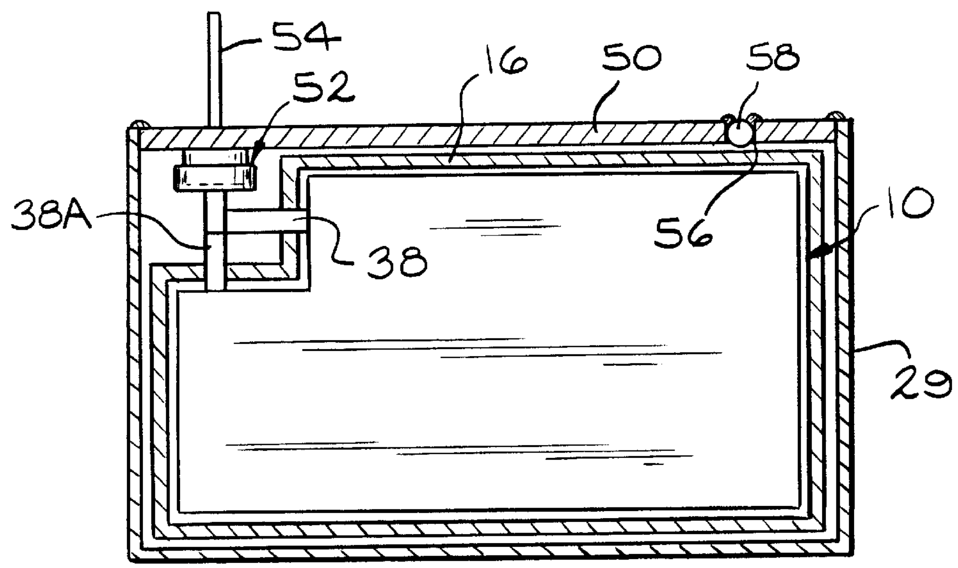
FIG. 4 is a side elevational view, partly in cross-section, of the electrode assembly 10 according to the present invention housed inside of a casing 29.

The preferred form of the flat-folded electrode assembly of the present invention is a case-negative design wherein the anode/cathode couple is inserted into the conductive metal casing 29 such that the casing is connected to the anode current collector 20 via anode tabs 26 and 28 (not shown in FIG. 4), as is well known to those skilled in the art. A preferred material for the casing is titanium although stainless steel, mild steel, nickel-plated mild steel and aluminum are also suitable. As shown in FIG. 4, the casing header comprises a metallic lid 50 having a sufficient number of openings to accommodate a glass-to-metal seal 52/terminal pin feedthrough 54 connected to the cathode electrode 14 via tabs 38 and 40. As previously discussed with respect to both the anode tabs 26, 28 and the cathode tabs 38, 40, the tabs can extend in both a horizontal and/or a vertical direction, or a variation thereof. FIG. 4 shows that cathode tab 38 connects to the cathode terminal pin 54 from a horizontal direction while an alternate embodiment of the present invention has cathode tab 38A extending in a vertical direction for connection to pin 54.

The anode electrode 12 is preferably connected to the casing 29 or the lid 50. An additional opening 56 is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over 58 the fill hole, but not limited thereto.

Figure 2:
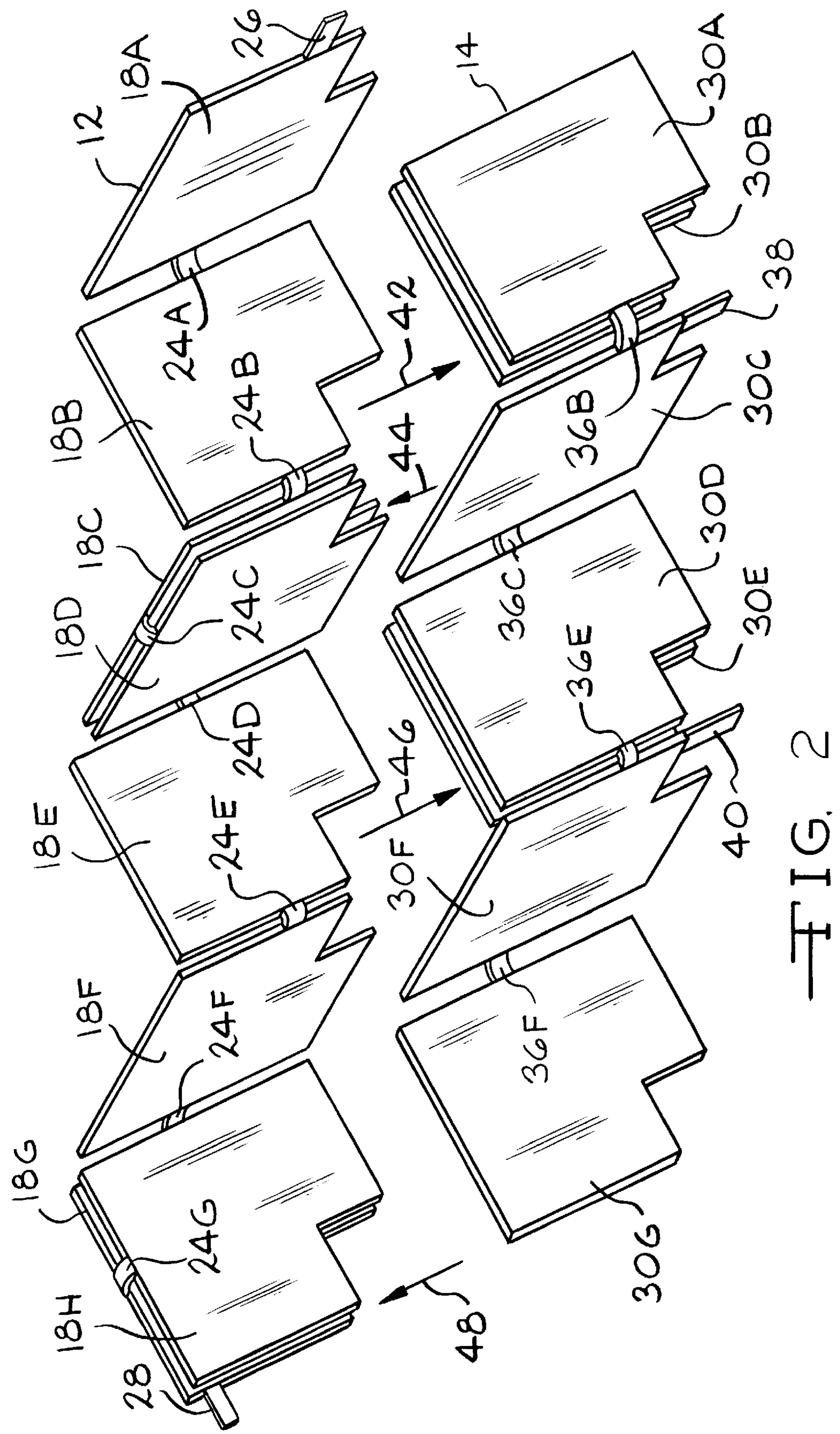
FIG. 2 is a perspective view showing the partially folded anode 12 being interleaved with the partially folded cathode 14.

In order that the flat-folded electrode assembly 10 has an anode plate provided as the first and the last plate in the assembly such as plates 18A and 18G having respective tabs 26 and 28 provided as the outermost tabs for connection to the casing 29, there is provided a staggered anode/cathode plate pair in which an anode plate is not interleaved between a cathode plate pair and a cathode plate is not interleaved between an anode plate pair. In FIGS. 1 and 2, the staggered plate pair 18F and 30F dictate that a negative anode plate will be both the first and the last plate in the electrode assembly so that tabs 26 and 28 are easily connected to the casing to provide the case-negative design.

Those skilled in the art, however, will readily recognize that the staggered plate pair 18F and 30F is not necessary to practice the flat-folded electrode assembly according to the present invention. In the alternative, only one anode plate, i.e., either 18A or 18G is the outermost plate and is connected to the casing in the case-negative configuration. This is not preferred as connection of the electrode assembly to the casing 29 at both ends of the electrode assembly 10 provides for improved electrical conductivity and enhanced discharge characteristics.

The cell of the present invention can also be constructed in a case-positive design. Further, the flat-folded, multi-plate electrode assembly of the present invention is readily adaptable to secondary, rechargeable electrochemical chemistries.

It is appreciated that various modifications to the invention concepts described herein may be apparent to those skilled in the art without departing from the spirit and the scope of the present invention defined by the hereinafter appended claims.

What is claimed is:

1. A battery, which comprises:

a) an anode electrode including an anode current collector supporting an anode active material, wherein the anode current collector consists of at least three longitudinal anode plates extending in a longitudinal direction and at least one lateral anode plate, wherein the longitudinally extending anode plates begin with a first anode plate directly connected to a second anode plate by a first longitudinal anode current collector portion only extending parallel to the longitudinal direction and with the second anode plate directly connected to a third anode plate by a second longitudinal anode current collector portion only extending parallel to the longitudinal direction and the longitudinally extending anode plates continuing sequentially in that manner to a second to last anode plate directly connected to a last anode plate by a last longitudinal anode current collector portion only extending parallel to the longitudinal direction, and wherein the at least one lateral anode plate, extends in a substantially perpendicular direction directly connected to one of the longitudinal anode plates by a lateral anode current collector portion only extending perpendicular to the longitudinal direction;

b) a cathode electrode including a cathode current collector supporting cathode active material, wherein the cathode current collector consists of at least three longitudinal cathode plates extending in the longitudinal direction and at least one lateral cathode plate, wherein the longitudinally extending cathode plates begin with a first cathode plate directly connected to a second cathode plate by a first longitudinal cathode current collector portion only extending parallel to the longitudinal direction and with the second cathode plate directly connected to a third cathode plate by a second longitudinal cathode current collector portion only extending parallel to the longitudinal direction and the longitudinally extending cathode plates continuing sequentially in that manner to a second to last cathode plate directly connected to a last cathode plate by a last longitudinal cathode current collector portion only extending parallel to the longitudinal direction, and wherein the at least one lateral cathode plate, extends in a substantially perpendicular direction directly connected to one of the longitudinal cathode plates by a lateral cathode current collector portion only extending perpendicular to the longitudinal direction;

c) a separator disposed between the anode electrode and the cathode electrode, wherein the at least one lateral anode plate is foldable toward the longitudinally extending anode plate from which it is connected by the lateral anode current collector portion to form at least one anode plate pair and the at least one lateral cathode plate is foldable toward the longitudinally extending cathode plate from which it is connected by the lateral cathode current collector portion to form at least one cathode plate pair, and wherein the anode and the cathode are operatively associated with each other such that at least one of the longitudinally extending anode plates is interleavable between the cathode plate pair and such that at least one of the longitudinally extending cathode plates is interleavable between the anode plate pair and wherein the resulting operatively associated and longitudinally extending anode and cathode plates are then foldable along the respective longitudinal current collector portions connecting between them to provide the battery as an electrode stack of alternating anode and cathode plates; and d) an electrolyte activating and operatively associating the anode electrode and the cathode electrode.

2. The battery of claim 1 wherein the battery comprising the alternating anode and cathode plates in the electrode stack consists of an anode plate as a first and a last plate of the electrode stack.

3. The battery of claim 1 wherein the anode electrode consists of one more anode plate than the cathode electrode consists of cathode plates.

4. The battery of claim 1 wherein the anode electrode is a unitary member.

5. The battery of claim 1 wherein the cathode electrode is a unitary member.

6. The battery of claim 1 wherein the cathode active material is selected from the group consisting of a carbonaceous material, a fluorinated carbon, a metal, a metal oxide, a metal sulfide and a mixed metal oxide, and mixtures thereof.

7. The battery of claim 1 wherein the cathode electrode further comprises at least one of a binder material and a conductive additive.

8. The battery of claim 7 wherein the binder material is a fluoro-resin power.

9. The battery of claim 7 wherein the conductive additive is selected from the group consisting of carbon, graphite powder, acetylene black and at least one metallic powder selected from the group consisting of titanium, aluminum, nickel and stainless steel, and mixtures thereof.

10. The battery of claim 1 wherein the anode electrode is comprised of a Group IA metal.

11. The battery of claim 1 wherein the electrolyte activating the anode electrode and the cathode electrode comprises an ion-forming alkali metal salt dissolved in a nonaqueous solvent, and wherein the alkali metal of the salt is the same as an alkali metal comprising the anode electrode.

12. The battery of claim 1 housed inside of a casing selected from the group consisting of titanium, stainless steel, milled steel, nickel-plated milled steel and aluminum, and mixtures thereof.

* * * * *